(12) United States Patent
Hwang

(10) Patent No.: US 8,043,547 B2
(45) Date of Patent: Oct. 25, 2011

(54) DEVICE FOR FORMING GROOVE PATTERN OF LIGHT-GUIDING PLATE AND METHOD FOR FORMING GROOVE PATTERN BY USING THE SAME

(75) Inventor: Jae Ho Hwang, Kyongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 334 days.

(21) Appl. No.: 11/638,560

(22) Filed: Dec. 14, 2006

(65) Prior Publication Data
US 2007/0090567 A1 Apr. 26, 2007

Related U.S. Application Data

(62) Division of application No. 10/618,738, filed on Jul. 15, 2003, now Pat. No. 7,160,097.

(30) Foreign Application Priority Data

Jul. 16, 2002 (KR) .............................. P2002-41555

(51) Int. Cl.
*B27N 3/18* (2006.01)
(52) U.S. Cl. ........ 264/319; 264/299; 264/239; 425/289; 425/290; 425/291; 425/298; 425/299
(58) Field of Classification Search .................. 264/319, 264/299, 239; 425/289, 290, 291, 298, 299
See application file for complete search history.

(56) References Cited

U.S. PATENT DOCUMENTS

| | | | | |
|---|---|---|---|---|
| 4,642,086 A | * | 2/1987 | Howarth, Jr. ................. | 493/341 |
| 5,366,685 A | * | 11/1994 | Fujii et al. ..................... | 264/547 |
| 5,635,256 A | | 6/1997 | Olson | |
| 5,644,979 A | * | 7/1997 | Raney .............................. | 100/35 |
| 5,735,988 A | * | 4/1998 | Chau et al. .................... | 156/209 |
| 5,922,238 A | * | 7/1999 | Savant et al. ...................... | 252/1 |
| 5,961,198 A | * | 10/1999 | Hira et al. ...................... | 362/621 |

* cited by examiner

*Primary Examiner* — Yogendra Gupta
*Assistant Examiner* — John Robitaille
(74) *Attorney, Agent, or Firm* — Birch, Stewart, Kolasch & Birch, LLP

(57) ABSTRACT

A device and method for forming a groove pattern in a light-guiding plate for obtaining high luminance and decreasing processing time, thereby improving yield. The device has a tool unit including a tool guide and a head which is further provided with a heating plate disposed below the tool unit; a stamper disposed under the heating plate; and a plurality of cutting tools extending from a lower side of the stamper at fixed intervals, for forming a plurality of groove patterns in a surface of the light-guiding plate.

1 Claim, 5 Drawing Sheets

DEVICE FOR FORMING GROOVE PATTERN OF LIGHT-GUIDING PLATE AND METHOD FOR FORMING GROOVE PATTERN BY USING THE SAME

This application is a Divisional of application Ser. No. 10/618,738, filed on Jul. 15, 2003 and now U.S. Pat. No. 7,160,097 for which priority is claimed under 35 U.S.C. §120. This application claims priority to Application No. P2002-41555 filed in Korea on Jul. 16, 2002 under 35 U.S.C. §119, the entire contents of both of which are hereby incorporated by reference.

BACKGROUND OF THE INVENTION

This application claims the benefit of the Korean Application No. P2002-41555 filed on Jul. 16, 2002, which is hereby incorporated by reference.

FIELD OF THE INVENTION

The present invention relates to a light-guiding plate of a liquid crystal display (LCD) device, and more particularly, a device for forming a groove pattern of a light-guiding plate of an LCD device for improving light efficiency, and a method for forming a groove pattern by using the same.

DISCUSSION OF THE RELATED ART

A Cathode Ray Tube (CRT), one of flat display devices, has been widely used for monitors of a television, a measuring machine and an information terminal. However, the CRT has limitations of miniaturization and lightness of weight due to its size and weight. Accordingly, display devices such as a liquid crystal display (LCD) device using an electro-optics effect, a plasma display panel (PDP) using a gas discharge and an Electro luminescence display (ELD) device using an electro-luminescence effect have been actively studied as a possible substitute for the CRT.

Among the display devices, the LCD device is the most actively studied because it has a low power consumption, a thin profile, lightness in weight and is highly developed for application to monitors for a desktop computer and to a large sized display device, as well as for a laptop computer. Accordingly, demands for LCD devices are continuously increasing.

The LCD device controls the transmittance of ambient light to display the picture image. In this respect, the LCD device requires an additional light source such as a backlight. The backlight is classified into a direct-type or an edge-type depending on the position of a lamp unit.

The LCD device uses a light source, such as an Electro Luminescence element (EL), a Light Emitting Diode (LED), a Cold Cathode Fluorescent Lamp (CCFL) or a Hot Cathode Fluorescent Lamp (HCFL). Especially, the CCFL having long lifetime, low power consumption and thin profile is used as the light source for a large sized color TFT LCD device.

In case of the CCFL method, a fluorescent discharge tube is used for achieving a penning effect, which is formed by injecting a hydrargyrum gas containing Argon Ar and Neon Ne at a low temperature. Also, electrodes are formed at both ends of the fluorescent discharge tube, and the cathode is formed in a plate-shape. When a voltage is applied thereto, electric charges inside the fluorescent discharge tube collide against the plate-shaped cathode like a sputtering state, thereby generating secondary electrons. Circumferential elements are excited by the secondary electrons, whereby plasma is generated. Also, the circumferential elements emit strong ultraviolet rays, and then the ultraviolet rays excite a fluorescent substance, thereby emitting visible rays.

In the edge-type method, a lamp unit is formed at one side of a light-guiding plate. The lamp unit includes a lamp, a lamp holder and a lamp reflecting plate. The lamp emitting light is inserted into both sides of the lamp holder, whereby the lamp is protected from an external impact. Also, the lamp reflecting plate covers a circumferential surface of the lamp, and one side of the lamp reflecting plate is inserted to one side of the light-guiding plate to reflect the light emitted from the lamp to the light-guiding plate. Generally, the edge-type method forming the lamp unit at the one side of the light-guiding plate is applied to relatively small sized LCD devices such as the monitors for the laptop type computer or the desktop type computer. The edge-type method is useful in obtaining uniform luminance, long lifetime and thin profile in the LCD device.

With the trend of the large-sized LCD device of 20-inch or more, the direct-type method is actively developed, in which a plurality of lamps are formed in one line on a lower surface of a light-diffusion plate, whereby the entire surface of the LCD panel is directly illuminated with the light. The direct-type method, which has greater light efficiency as compared with that of the edge-type method, is used for the large-sized LCD device requiring high luminance. That is, the LCD device of the direct-type method is generally used for the large-sized monitor or television. The large-sized monitor or television may be driven for a long time, and has a plurality of lamps, whereby it tends to have the lamps turned off. However, in the LCD device of the edge-type method having lamp units at both sides of the light-guiding plate, big problems are not caused, except a decrease in luminance even though one lamp is turned off. Meanwhile, in the direct-type LCD device, a plurality of lamps are formed underneath a screen. Accordingly, if one of the lamps is turned off due to problems in the lamp or an exhaustion of the lamp life, a screen portion corresponding to the turned-off lamp portion becomes darker when compared with surrounding portions of the screen. In this respect, the direct-type LCD device has to have a simple structure suitable for disassembly and assembly of the lamp unit.

A general backlight assembly will be described as follows.

FIG. 1 is a schematic view illustrating a general backlight assembly. As shown in FIG. 1, the general backlight assembly includes a fluorescent lamp 10, a light-guiding plate 20, a light-diffusion substance 30, a reflecting plate 40, a light-diffusion plate 50 and a prism sheet 60. When a voltage is applied to the fluorescent lamp 10, electrons remaining in the fluorescent lamp 10 move to the anode, and the remaining electrons collide with argon Ar, whereby the argon Ar is excited. As a result, positive ions are generated, and the positive ions collide against the cathode, thereby generating secondary electrons. When the secondary electrons are discharged to the fluorescent lamp 10, the flow of the electrons collides with hydrargyrum vapor, and then ionized, thereby emitting ultraviolet rays and visible rays. Then, the emitted ultraviolet rays excite a fluorescent substance deposited inside the fluorescent lamp, thereby emitting light.

The light-guiding plate 20 is a Wave-Guide which makes the light emitted from the fluorescent lamp 10 to be incident on the inside, and to emit a plate type light source. The light-guiding plate 20 is formed of Polymethyl Methacrylate (PMMA) having a large light transmittance. The light incidence of the light-guiding plate 20 is related to the ratio between the light-guiding plate thickness and the fluorescent lamp diameter, the distance between the light-guiding plate and the fluorescent lamp 10, and the shape of the reflecting plate. Generally, the fluorescent lamp 10 is positioned on a slant relative to the center of the light-guiding plate 20 in the thickness direction, thereby improving the efficiency of the light incidence. The light-guiding plate 20 for the backlight unit of the LCD device is divided into a printing-type light-guiding plate, a V-cut type light-guiding plate, and a scattering-type light-guiding plate.

The light-diffusion substance 30 is comprised of $SiO_2$ particles, PMMA and solvent. At this time, $SiO_2$ particles having porosity are used for diffusing the light. Also, PMMA is used for adhering the $SiO_2$ particles to the lower surface of the light-guiding plate 20. The light-diffusion substance 30 is deposited on the lower surface of the light-guiding plate 20 in dotted patterns, and the sizes of the dotted patterns are gradually increased to obtain a uniform plate-type light source on an upper surface of the light-guiding plate 20. That is, the dotted pattern has a small size in the unit area near the fluorescent lamp 10, and the dotted pattern has a large size in the unit area apart from the fluorescent lamp 10. At this time, the shape of the dotted pattern may be varied. In case of the dotted patterns having the same size, the respective dotted patterns have luminance of the same level, regardless of the dotted shape.

Subsequently, the reflecting plate 40 is formed at the rear of the light-guiding plate 20, whereby the light emitted from the fluorescent lamp 10 is incident on the inside of the light-guiding plate 20. Also, the light-diffusion plate 50 is formed on the upper surface of the light-guiding plate 20, on which the dotted patterns are deposited, to obtain a uniform luminance at each viewing angle. The light-diffusion plate 50 is formed of PET or Poly Carbonate (PC) resin, and a particle-coating layer is formed on the light-diffusion plate 50 for diffusing the light.

Next, the prism sheet 60 is formed to improve the frontal luminance of the light transmitted and reflected to the upper side of the light-diffusion plate 50. That is, the prism sheet 60 transmits the light of a predetermined angle, and the light incident on the other angles is totally reflected, whereby the light is reflected to the lower side of the prism sheet 60 by the reflecting plate 40 formed on the lower side of the light-guiding plate 20. The backlight assembly having the aforementioned structure is fixed to a mold frame, and a display unit disposed at an upper side of the backlight assembly is protected by a top sash. Also, the backlight assembly and the display unit are received between the top sash and the mold frame which are coupled to each other. The backlight assembly having the aforementioned structure is classified into a print pattern method and a V-cut method according to a structure of the light-guiding plate.

FIG. 2A and FIG. 2B schematically illustrate a method for forming a dot pattern according to a related art print pattern method. As shown in FIG. 2A and FIG. 2B, a printing process and a drying process are performed. First, referring to FIG. 2A, a mask 22 having an opening of a predetermined width is positioned on a light-guiding plate 21 of an acrylic material. Subsequently, ink 23 having a viscosity is deposited on the mask, and then the mask, having the ink 23 thereon is pressed by a rubber squeegee 24 for squeezing the ink 23 into the opening of the mask 22, thereby forming a plurality of island-shaped dot patterns 25. At this time, the printing process is performed with the ink (paint, varnish) 23 containing glass power, pearl power or mica power at a predetermined ratio for achieving the effective diffusion and reflection of light inside the light-guiding plate 21.

Referring to FIG. 2B, ultraviolet rays are irradiated to the dot patterns 25 for hardening the ink on the light-guiding plate 21. At this time, the ultraviolet rays may be irradiated at both the rear and front sides, or at one side of the rear and front. In case where the light-guiding plate 21 has a low light transmittance, it is preferable to irradiate the ultraviolet rays directly onto the surface containing the ink. If the light-guiding plate 21 has a high light transmittance, the ultraviolet rays may be irradiated at the rear side as well as at the surface containing the ink.

In the aforementioned print pattern method, the plurality of dot patterns 25 are formed on the light-guiding plate 21 of the acrylic material in a type of matrix. In order to obtain a uniform plate-type light source by controlling the light-guiding effect of the acrylic material and the diffusion effect of the light, the diffusion dots are arranged at wide intervals at the portion adjoining the fluorescent lamp, and at narrow intervals at the portion more distant from the fluorescent lamp. Also, in the print pattern method, a reflecting sheet of polyethylene terephthalate (PET) is positioned below the light-guiding plate 21, and another reflecting sheet of PET is positioned at the side (except an incident surface) of the light-guiding plate 21, whereby the light passing through the diffusion dots is incident on the light-guiding plate. However, the aforementioned print method has problems of diffusion function of the light-guiding plate according to ink density inferiority, and a decrease of light-efficiency as the ink absorbs the light. Also, in the drying process of the ink, the light-guiding plate may be bent according to the heating process, and the yield is lowered by the heating process time.

FIG. 3 schematically illustrates a device for forming a groove pattern of a light-guiding plate according to related art. The related art V-cut method is different from the print pattern method in that a plurality of groove patterns are formed on a light-guiding plate instead of forming the plurality of dot patterns on a lower surface of a light-guiding plate, in which the groove patterns serve as the dot patterns of the print pattern method.

As shown in FIG. 3, a plurality of groove patterns 30 are formed on a surface of a light-guiding plate 10 by a plurality of tools 20, thereby generating diffused reflection. In the device for forming the groove pattern of the light-guiding plate according to the related art, a tool unit 40 having the tools 20 therein includes a tool guide 41 and a head 43. Also, the tool guide 41 includes a tool guide body 41a, and a guide means (not shown) in the tool guide body 41a. The guide means may be formed of a guide groove, a guide projection, or an LM bearing. When the head 43 is guided by the tool guide 41, the head 43 is moved in state of being connected to a cylinder unit 50. The head 43 connected to a piston 51 of the cylinder unit 50 includes two guide plates for forming the guide groove. The piston 51 is provided between the head 43 and a cylinder 53 for achieving a reciprocating movement of the head 43 according to pressure generated from the cylinder 53.

The cylinder unit 50 is provided for moving the plurality of tools 20 reciprocally at a predetermined direction in a non-work area. The cylinder unit 50 is controlled by a control unit (not shown), and operated by hydraulic pressure or air pressure provided from a compressor (not shown). Meanwhile, the cylinder unit 50 and the tool unit 40 are fixed by a fixing plate 52. Each of the tools 20 includes a rectangular or round body 20a, and a pyramid-shaped scratch part 20b disposed under the body 20a. At this time, the scratch part 20b forms the groove pattern 30 in the surface of the light-guiding plate 10. The scratch part 20b is formed of a processed diamond material. A control unit 60 is formed at an upper side of the cylinder unit 50. The control unit 60 serves as a pressure control member for controlling the pressure applied to the cylinder unit 50 so as to correspond to the thickness of the light-guiding plate 10. Herein, the pressure control member includes a main tube 62 and a sub-tube 64.

In the aforementioned device for forming a groove pattern in the light-guiding plate according to the related art, the cylinder unit 50 is operated for moving the plurality of tools 20 downward by maintaining a predetermined pressure, thereby pressing the scratch parts 20*b* of tools 20 in the surface of the light-guiding plate 10 at a predetermined depth. As a result, the plurality of groove patterns 30 are formed in the surface of the light-guiding plate 10.

In the related art V-cut method, the reflecting sheet is positioned below the light-guiding plate, and the reflecting sheet may be wrinkled since the reflecting sheet is expanded due to the heat generated from a backlight assembly in the same way as a silk print type. When the reflecting sheet is wrinkled, the luminance is lowered accordingly since the reflection of the light is not uniform, and the uniformity of the light is decreased according to spots generated on an LCD panel, thereby lowering the quality of the device and increasing manufacturing cost.

In the related art method for the backlight unit of the LCD device, much time is spent to obtain the optimized dot pattern for the uniform plate-type light source. Also, there is experimental fact relating to the dot pattern design without a basic theory, and the dot pattern design is applied to only the print method. That is, it is hard to apply the dot pattern design to the V-cut method or the diffused light-guiding plate method. Furthermore, the dot pattern design has problems such that it is hard to improve luminance at a predetermined portion. When forming the groove pattern of the V-cut method, only one tool is provided to form the groove pattern, so that much time is spent to form a plurality of groove patterns on a large-sized light-guiding plate, thereby lowering yield.

SUMMARY OF THE INVENTION

Accordingly, the present invention is directed to a device and method for forming a groove pattern on a light-guiding plate which substantially obviates one or more problems, limitations and disadvantages of the related art.

An object of the present invention is to provide a device and method for forming a groove pattern on a light-guiding plate for obtaining high luminance and decreasing processing time, thereby improving yield.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present invention, as embodied and broadly described herein, a device is provided for forming a groove pattern in a light-guiding plate, the device having a tool unit including a tool guide and a head, including a heating plate below the tool unit; a stamper under the heating plate; and a plurality of tools on the lower side of the stamper at fixed intervals, for forming a plurality of groove patterns in the surface of the light-guiding plate.

At this time, the light-guiding plate is fixed to a holder having a vacuum structure, and the stamper is formed of a metal plate.

In another aspect, the device for forming a groove pattern in a light-guiding plate, contains a tool unit including a tool guide and a head, and includes a heating plate disposed below the tool unit; a stamper provided under the heating plate; a heating nipper surrounding both sides of the heating plate and the stamper; and a plurality of tools provided on the lower side of the stamper at fixed intervals, for forming a plurality of groove patterns in a surface of the light-guiding plate.

In another aspect, the method for forming a groove pattern in a light-guiding plate using a tool unit having a plurality of tools includes fixing the light-guiding plate to a holder having a vacuum structure, applying heat and pressure to the plurality of tools of the tool unit, and forming a plurality of groove patterns in the surface of the light-guiding plate.

In still another aspect, the method for forming a groove pattern of a light-guiding plate using a tool unit having a plurality of tools includes fixing the light-guiding plate to a holder having a vacuum structure, forming a plurality of groove patterns in the surface of the light-guiding plate by applying heat and pressure to the plurality of tools of the tool unit, and simultaneously cutting the light-guiding plate to a desired size.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a device and method for forming a groove pattern in a light-guiding plate according to the present invention will be described with reference to the accompanying drawings.

Figure 1:
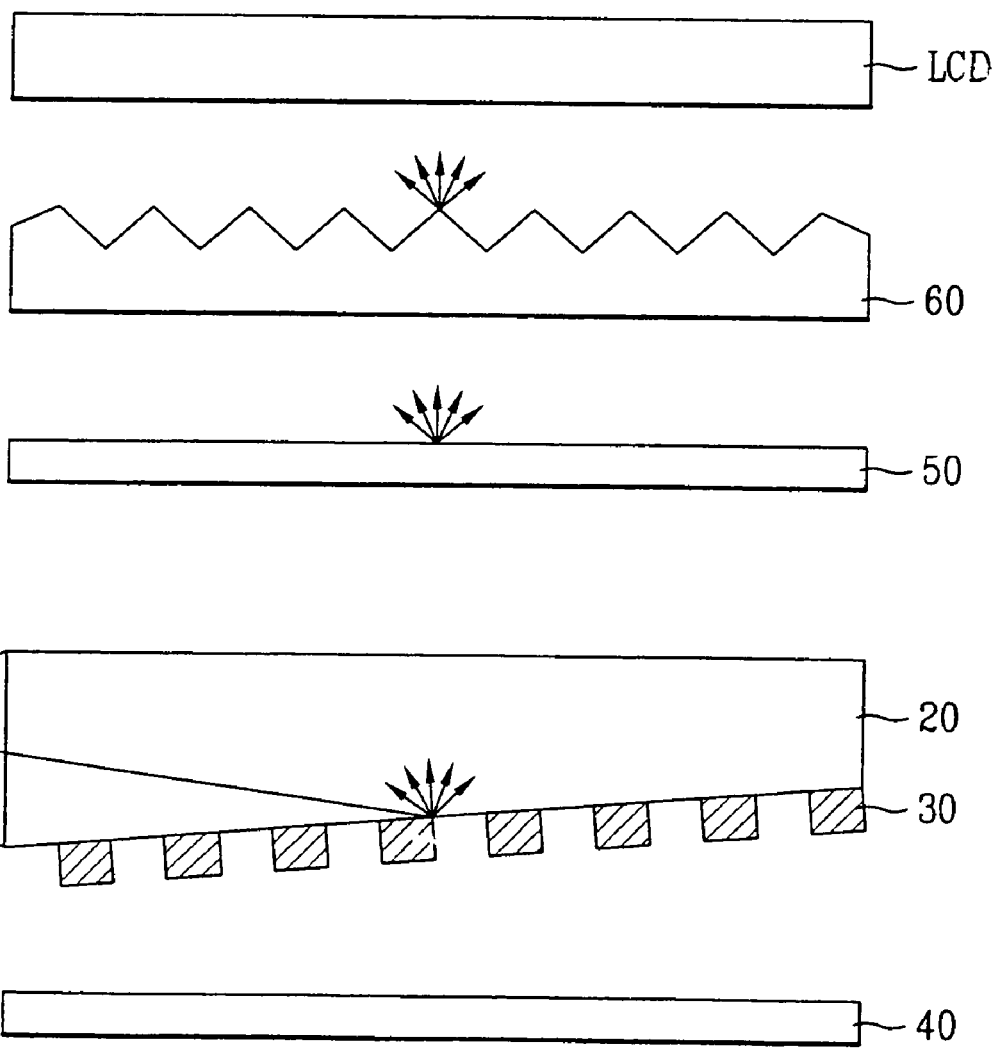
FIG. 1 schematically illustrates a backlight assembly according to the related art.
Figure 2A:
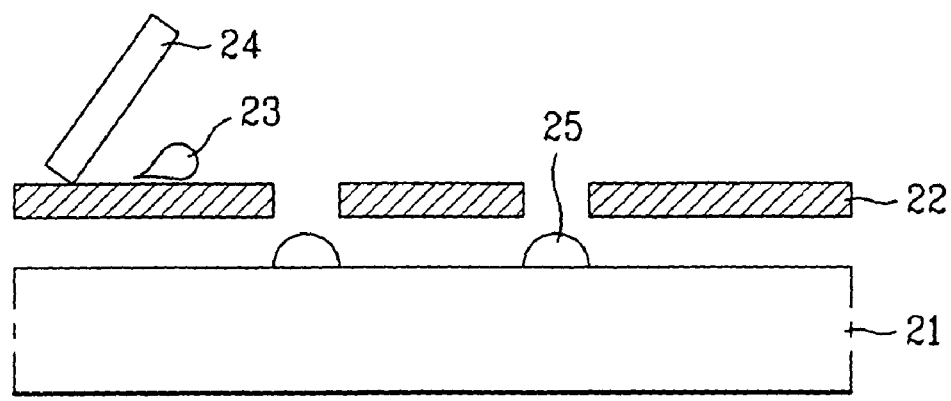
FIG. 2A and FIG. 2B schematically illustrate a method for forming a dot pattern according to a related art print pattern method.
Figure 2B:
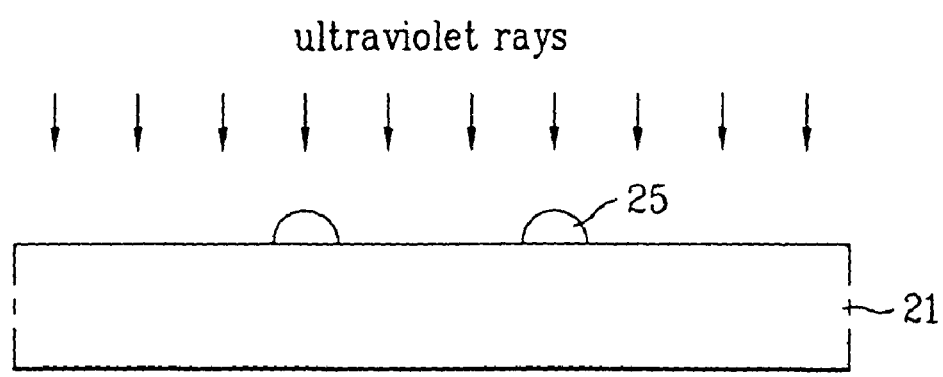
Figure 3:
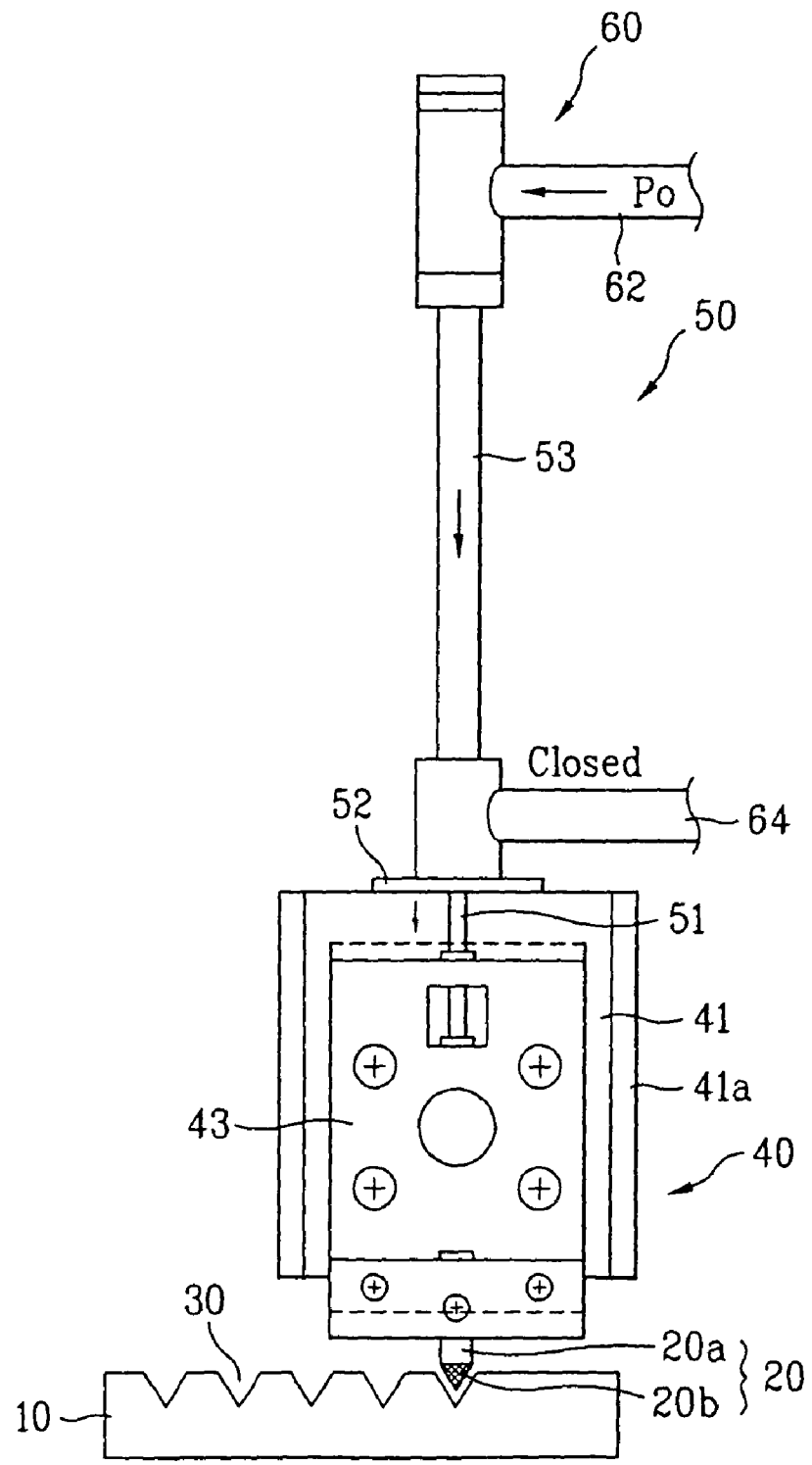
FIG. 3 schematically illustrates a device for forming a groove pattern of a light-guiding plate according to the related art.
Figure 4:
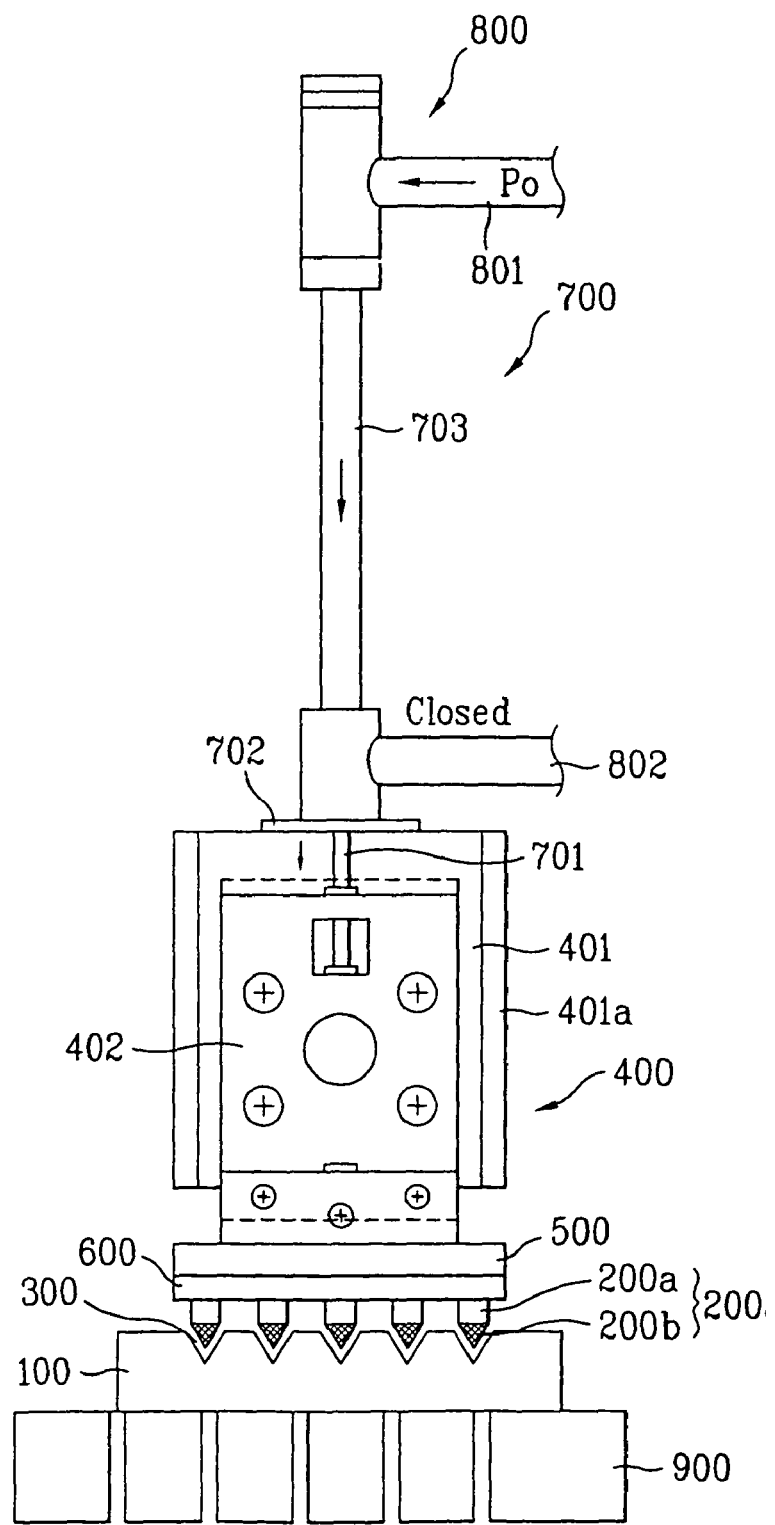
FIG. 4 schematically illustrates a device for forming a groove pattern in a light-guiding plate according to a first embodiment of the present invention.

FIG. 4 schematically illustrates a device for forming a groove pattern in a light-guiding plate according to the first embodiment of the present invention. As shown in FIG. 4, a plurality of groove patterns 300 are formed in the surface of a light-guiding plate 100 by heating with a plurality of tools 200, thereby generating diffused reflection. The device for forming the groove pattern of the light-guiding plate according to the present invention includes a heating plate 500, a stamper 600, and a plurality of tools 200. The heating plate 500 is formed below a tool unit 400 containing the plurality of tools 200, and the stamper 600 is formed of a metal plate for receiving the heat from the heating plate 500. The plurality of tools 200 are formed at the lower side of the stamper 600 at fixed intervals.

The tool unit 400 having the plurality of tools 200 includes a tool guide 401, a head 402, the heating plate 500 and the stamper 600. Also, the tool guide 401 includes a tool guide body 401a, and a guide means (not shown) containing the tool guide body 401 therein. The guide means may be formed of a guide groove, a guide projection, or an LM bearing. When the head 402 is guided by the tool guide 401, the head 402 is moved in the state of being connected to a cylinder unit 700. The head 402 connected to a piston 701 of the cylinder unit 700 includes two guide plates for forming the guide groove. The piston 701 is provided between the head 402 and a cylinder 703 for achieving a reciprocating movement of the head 402 according to the pressure generated in the cylinder 703. The cylinder unit 700 is provided for moving the plurality of tools 200 reciprocally, at a predetermined direction in a non-work area. The cylinder unit 700 is controlled by a control unit (not shown), and operated by hydraulic pressure or air pressure provided from a compressor (not shown). Meanwhile, the cylinder unit 700 and the tool unit 400 are fixed by a fixing plate 702. Each of the tools 200 includes a rectangular or round body 200a, and a pyramid-shaped scratch part 200b disposed under the body 200a. At this time, the scratch part 200b forms the groove pattern 300 in the surface of the light-guiding plate 100. The scratch part 200b is formed of a processed diamond material.

The control unit 800 is formed at an upper side of the cylinder unit 700. The control unit 800 serves as a pressure control member for controlling the pressure applied to the cylinder unit 700 to correspond to the thickness of the light-guiding plate 100. The pressure control member includes a main tube 801 and a sub-tube 802. The main tube 801 is provided to apply an initial pressure or a supplementary pressure to the cylinder 703, and the sub-tube 802 is provided to exhaust the surplus pressure from the cylinder 703 to the outside. The initial pressure is the pressure provided to the surface of the light-guiding plate 100 for forming the groove pattern 300 on the light-guiding plate 100 when the plurality of tools 200 are spaced apart from the light-guiding plate 100 at a fixed interval prior to fabricating the light-guiding plate 100. Supposing that the thickness of the light-guiding plate 100 is uniform, the initial pressure means normal pressure for forming the groove pattern 300. Also, the supplementary pressure means the pressure required inside the cylinder 703 to move the plurality of tools 200 downward as the thickness of the light-guiding plate 100 becomes thin during patterning of the groove pattern 30 at the normal pressure. That is, the supplementary pressure corresponds to the variation thickness of the light-guiding plate 100. The initial pressure and the supplementary pressure are measured in due consideration of the weight of the plurality of tools 200 and the head 402. The surplus pressure means unnecessary pressure inside the cylinder 703 when it is required to move the plurality of tools 200 upward as the thickness of the light-guiding plate 100 becomes thick during the forming of the groove pattern 300 at the normal pressure. Thus, the surplus pressure is exhausted from the cylinder 703. That is, the surplus pressure corresponds to a thickness variation of the light-guiding plate 100, and the surplus pressure is measured in due consideration of the weight of the plurality of tools 200 and the head 402.

Meanwhile, the main tube 801 connected to the upper side of the cylinder 703 moves the piston 701 inside the cylinder 703 downward by using the pressure from the compressor, thereby moving the plurality of tools 200 provided at the lower side of the head 402 downward. The sub-tube 802 connected to the lower side of the cylinder 703 moves the piston 701 inside the cylinder 703 upward by exhausting the pressure inside the cylinder 703, thereby moving the plurality of tools 200 provided at the lower side of the head 402 upward.

The process for forming the groove pattern on the light-guiding plate with the aforementioned device will be described as follows.

First, the light-guiding plate 100 adheres to a holder 900 having a vacuum structure, and then the cylinder unit 700 is operated for moving the plurality of tools 200 downward by maintaining a predetermined pressure, thereby pressing the scratch parts 200b of the tools 200 against the surface of the light-guiding plate 100 at a predetermined depth. Simultaneously, the plurality of groove patterns 300 are formed in the surface of the light-guiding plate 100 using the stamper 600 heated by the heating plate 500. At this time, it is possible to easily form a groove pattern in the light-guiding plate 100 since the surface of the light-guiding plate 100 is made soft by the stamper 600 heated from 50° C. to 120° C. Also, after forming the plurality of groove patterns 300 in the surface of the light-guiding plate 100, the light-guiding plate 100 is fixed by the holder 900 having the vacuum structure bottom for separating the stamper 600 from the light-guiding plate 100.

Figure 5:
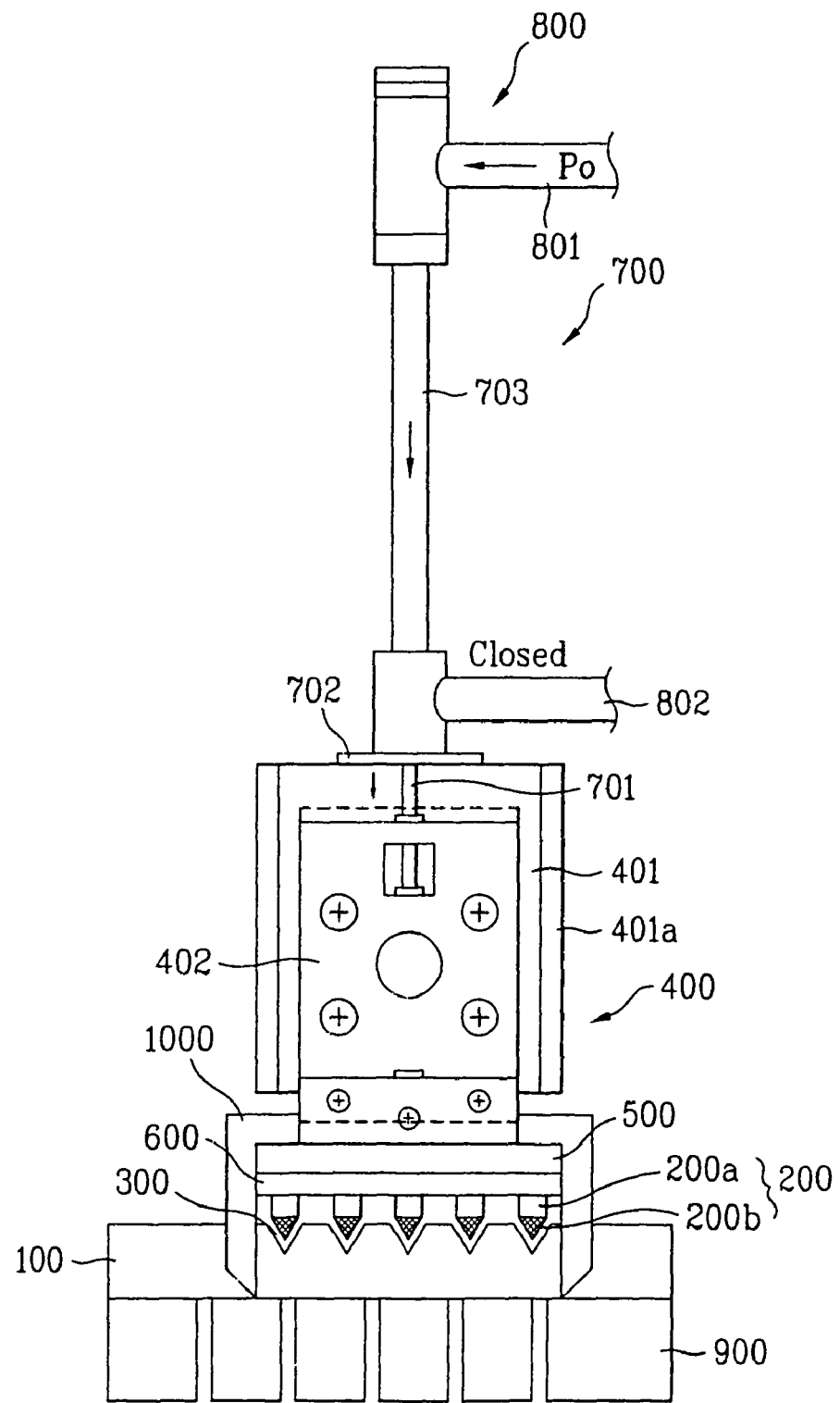
FIG. 5 schematically illustrates a device for forming a groove pattern in a light-guiding plate according to a second embodiment of the present invention.

FIG. 5 schematically illustrates a device for forming a groove pattern of a light-guiding plate according to a second embodiment of the present invention.

The second embodiment of the present invention is different from the first embodiment of the present invention in that a heating nipper 1000 surrounds both sides of the light-guiding plate 100 and the stamper 600 is provided for cutting the light-guiding plate 100 during stamping, thereby simplifying the manufacturing process, and improving yield. In the first embodiment of the present invention, the plurality of groove patterns 300 are formed in the surface of a precut light-guiding plate 100. In the second embodiment of the present invention, the plurality of groove patterns 300 are formed in the surface of an uncut light-guiding plate 100, simultaneously, the light-guiding plate 100 being cut according to a desired size.

In the preferred embodiments of the present invention, the light-guiding plate 100 is formed of a single material or a copolymer of acrylic polymers, polycarbonate resins, polymethyl methacrylate, polyacrylic acid esters, acrylic acid esters, methylacrylic acid esters, thermoplastic resins such as polyesters, polyethyleneterephtalate or polybuthyleneterephtalate, polycarbonates, polystyrene, polymethyl pentene, urethane acrylates or polyester acrylates cross linked by ultraviolet ray or electron beams, transparent resin such as unsaturated polyesters, and ceramics of transparent glass.

As mentioned above, the device and method for forming the groove pattern of the light-guiding plate according to the present invention has the following advantages.

First, a plurality of groove patterns can be simultaneously formed on the plane light-guiding plate, thereby improving yield by decreasing manufacturing time. Also, the process for forming the groove patterns is performed with the cutting process of the light-guiding plate at the same time, thereby improving yield.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for forming a groove pattern in a light-guiding plate of an LCD device by using a tool unit having a plurality of tools, which comprises:

fixing the light-guiding plate by a holder having a vacuum structure bottom for separating a stamper from the light-guiding plate;

moving the plurality of tools of the tool unit downward by maintaining a predetermined pressure, wherein the downward the plurality of tools moves a piston inside a cylinder downward by using the pressure from the compressor, thereby moving the plurality of tools provided at the lower side of a head downward;

moving the plurality of tools of the tool unit upward by maintaining a predetermined pressure, wherein the upward the plurality of tools moves the piston inside the cylinder upward by exhausting the pressure inside the cylinder, thereby moving the plurality of tools provided at the lower side of the head upward;

forming a plurality of groove patterns in a surface of the light-guiding plate by applying heat and pressure to the plurality of tools of the tool unit and pressing the surface of the light-guiding plate with the plurality of tools of the tool unit and simultaneously, cutting the light-guiding plate by using a heating nipper surrounding both sides of the light-guiding plate and the stamper, wherein the cutting the light-guiding plate step occurs when the plurality of groove patterns are formed in the surface of an uncut light-guiding plate and the light-guiding plate is cut according to a desired size simultaneously, wherein the heating nipper surrounding both sides of the heating plate and the stamper is heated by the heating plate, and the light-guiding plate is cut using the heating nipper heated by the heating plate and the stamper, and wherein the plurality of tools are formed at the lower side of the stamper at fixed intervals, and each of the tools includes a rectangular or round body and a pyramid-shaped scratch part disposed under the body.

* * * * *